United States Patent
Kimura

(10) Patent No.: US 8,599,415 B2
(45) Date of Patent: Dec. 3, 2013

(54) INFORMATION PROCESSING SYSTEM AND METHOD FOR MANAGING PROFILE

(75) Inventor: Mikako Kimura, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 250 days.

(21) Appl. No.: 13/281,042

(22) Filed: Oct. 25, 2011

(65) Prior Publication Data

US 2012/0274964 A1   Nov. 1, 2012

(30) Foreign Application Priority Data

Oct. 26, 2010   (JP) ................. 2010-239742

(51) Int. Cl.
*G06F 3/12*     (2006.01)
*G06K 15/00*    (2006.01)

(52) U.S. Cl.
USPC .............. 358/1.15; 358/1.13; 358/1.16

(58) Field of Classification Search
None
See application file for complete search history.

(56) References Cited

U.S. PATENT DOCUMENTS

| | | | |
|---|---|---|---|
| 5,077,795 A * | 12/1991 | Rourke et al. | 380/55 |
| 2003/0154218 A1* | 8/2003 | Eden | 707/200 |
| 2004/0021900 A1* | 2/2004 | Arakawa | 358/1.15 |
| 2005/0177799 A1* | 8/2005 | Knight et al. | 715/810 |
| 2009/0125911 A1* | 5/2009 | Lazarus | 718/104 |

FOREIGN PATENT DOCUMENTS

| | | |
|---|---|---|
| JP | 2005-184612 A | 7/2005 |
| JP | 2007-293654 A | 11/2007 |

* cited by examiner

*Primary Examiner* — Dov Popovici
(74) *Attorney, Agent, or Firm* — Edwards Wildman Palmer LLP; David G. Conlin; George N. Chaclas

(57) ABSTRACT

An information processing system including a multifunction peripheral for reading a document according to a profile set by a user. A host server stores the profile and a management section registers and deletes the profile. An information processing terminal has a setting processing section for providing the profile being set by the user to the management section. The storage section preliminarily stores an identification code for management. The setting processing section acquires an identification code for determination and provides that code to the management section prior to profile registration. The management section compares the identification code for determination with the identification code for management to register the profile provided by the information processing terminal without a time limit when the codes match or register the profile with a time limit when the codes do not match to delete the profile when the time limit elapses.

9 Claims, 11 Drawing Sheets

INFORMATION PROCESSING SYSTEM AND METHOD FOR MANAGING PROFILE

CROSS-REFERENCE TO RELATED APPLICATION

This application is related to Japanese Patent Application No. 2010-239742 filed on Oct. 26, 2010, whose priority is claimed and the disclosure of which is incorporated by reference in its entirety.

BACKGROUND OF THE INVENTION

1. Field of the Invention

The present invention relates to an information processing system including a multifunction peripheral acquiring image data by a scanning function, a host server and an information processing terminal connected through a network. More particularly, the present invention relates to registration and deletion of a condition setting (profile) to use for reading of a document in a MFP.

2. Description of the Related Art

Multifunction peripherals (hereinafter, simply referred to as MFPs) that acquire image data by a scanning function are in widespread use. Generally, such MFPs are often used in an information processing system including a server and information processing terminals such as a personal computer (PC) connected through a network. A MFP is connected to the network to be a part of the information processing system, and receives printing data from each information processing terminal in the information processing system and transmits read image data to each information processing terminal or the server. Thus, the MFP is used as, so to speak, a public input-output device in the information processing system by users who operate the information processing terminals.

For example, the users may use the MFP forming a part of the information processing system by creating settings for scanning and printing jobs with the information processing terminals and registering the settings in the MFP as profiles to use the registered profiles at the time of job execution. When a job is executed, a user searches an appropriate profile from the profiles registered in the MFP. When the MFP has the appropriate profile, it is selected. When the MFP does not have the appropriate profile, a new profile is registered and used. The MFP executes a scanning or printing job according to the selected or newly registered profile.

Recently, there have been an increasing number of cases where portable personal computers, so-called mobile PCs are used as the information processing terminals. A user connects a mobile PC to the above-mentioned information processing system temporarily and uses the MFP in the information processing system as the input-output device. For example, a document saved in the mobile PC is printed with the MFP or a document is scanned with the MFP and a read image data is introduced into the mobile PC. Thus, some users use the information processing system not only via the information processing terminals fixedly connected to the information processing system but also via mobile PCs temporarily connected to the information processing system.

In such usage, a profile is registered for the temporary use by the user, and the registered profile is left in the MFP even after the end of a job according to the profile. This is because the profile, necessary or unnecessary, is to be accumulated in the MFP unless the user manually deletes the profile.

Against this problem, there is a known information processing system in which a MFP registers a box (theoretical storage place) for each user for storing image data and the registration of the box is erased when it is determined that the use history of the box fulfills preset registration erasure conditions (see Japanese Unexamined Patent Application Publication No. 2005-184612, for example).

The term "profile" used herein means data defining operating conditions for execution of scanning and printing in the MFP. The term "ad hoc" means that a profile is of temporary use.

When unnecessary profiles are accumulated in the MFP, it will be less easy for a user of the MFP to find a profile necessary for the user. For executing a job, generally, the user logs in to an operation panel of the MFP to select the profile needed for executing the job. On a profile selection screen, on which the selection of the profile is performed, ad hoc profiles are displayed as well as profiles registered by the user. This is because it is convenient to treat the ad hoc profiles as, so to speak, public profiles, which do not belong to a specific user. Contrarily, however, it is inconvenient when too many ad hoc profiles are accumulated to prevent identification of the user's profiles on the profile selection screen.

SUMMARY OF THE INVENTION

In view of the above-described circumstances, the present invention has been achieved to solve, without bothering a user, the problem in profile selection to be impeded when a profile created for temporary use of a MFP is left undeleted after the use.

According to an aspect of the present invention, there is provided an information processing system, including: (1) a multifunction peripheral for reading a document according to a condition set by a user; (2) a host server communicably connected with the multifunction peripheral and having a storage section for storing the condition as a profile and a management section capable of executing registration of the profile in the storage section and deletion of the registered profile; and (3) an information processing terminal communicably connected with the host server and having a user interface section for receiving the profile being set by the user and a setting processing section for providing the received profile to the management section, wherein the storage section preliminarily stores an identification code for management to use for the management of the profile, the setting processing section acquires an identification code for determination and provides the code to the management section prior to the registration of the profile, and the management section compares the provided identification code for determination with the identification code for management to register the profile provided by the information processing terminal in the storage section without a time limit when the codes match or register the profile provided by the information processing terminal with a time limit when the codes do not match to delete the profile when the time limit elapses.

According to another aspect of the present invention, there is provided a method for managing a profile in an information processing system, the information processing system including: (1) a multifunction peripheral for reading a document according to a condition set by a user; (2) a host server communicably connected with the multifunction peripheral and having a storage section for storing the condition as a profile and a management section capable of executing registration of the profile in the storage section and deletion of the registered profile; and (3) an information processing terminal communicably connected with the host server and having a user interface section for receiving the profile being set by the user and a setting processing section for providing the received profile to the management section, the method including: storing an identification code for management to use for the management of the profile in the storage section by use of the management section; acquiring an identification code for determination and provides the acquired identification code for determination to the management section prior to the registration of the profile by use of the setting processing section; and comparing the identification code for determination with the identification code for management by use of the management section to register the profile provided by the information processing terminal in the storage section without a time limit when the codes match or register the profile provided by the information processing terminal with a time limit when the codes do not match to delete the profile when the time limit elapses.

According to still another aspect of the present invention, there is provided a host server communicably connected with an external multifunction peripheral for reading a document according to a condition set by a user and with an external information processing terminal, the host server including: a storage section for storing the condition as a profile, and a management section capable of executing registration of the profile in the storage section and deletion of the registered profile, wherein the information processing terminal receives the profile being set by the user and provides the profile to the management section, the storage section preliminarily stores an identification code for management to use for the management of the profile, the setting processing section acquires an identification code for determination and provides the code to the management section prior to the registration of the profile, and the management section compares the provided identification code for determination with the identification code for management to register the profile provided by the information processing terminal in the storage section without a time limit when the codes match or register the profile provided by the information processing terminal with a time limit when the codes do not match to delete the profile when the time limit elapses.

The present invention achieves temporary use of a profile and management of the profile after the temporary use by separately managing the identification code for determination and the identification code for management in the client information processing terminal and in the host server. Whether the profile is ad hoc is determined by determining whether the identification code for determination managed in the client and the identification code for management managed in the host server match.

In the present invention, the management section compares the provided identification code for determination with the identification code for management to register the profile provided by the information processing terminal in the storage section without a time limit when the codes match or register the profile provided by the information processing terminal with a time limit when the codes do not match to delete the profile when the time limit elapses, and it is therefore possible to determine whether or not the profile is ad hoc by determining whether or not the codes match. Based on the result, an ad hoc profile that has passed its period of use is deleted so that no unnecessary profile is displayed on the profile selection screen. Thus, the user can find a profile to use more easily.

The profile is not stored in the MFP but registered in the independent host server for the following reason. If a profile is stored in a MFP and when a user uses a plurality of MFPs, it is necessary to register the same profile in the respective MFPs to complicate the registration and the management. Centralized storage of profiles in one host server in the information processing system eliminates the redundant work.

While the profiles are stored in the host server, image data and data for document filing obtained by scanning in the MFP do not need to be stored in the host server with the profiles and may be stored in each MFP, because the image data and the profiles are independent of each other.

DETAILED DESCRIPTION OF THE PREFERRED EMBODIMENTS

Figure 1:
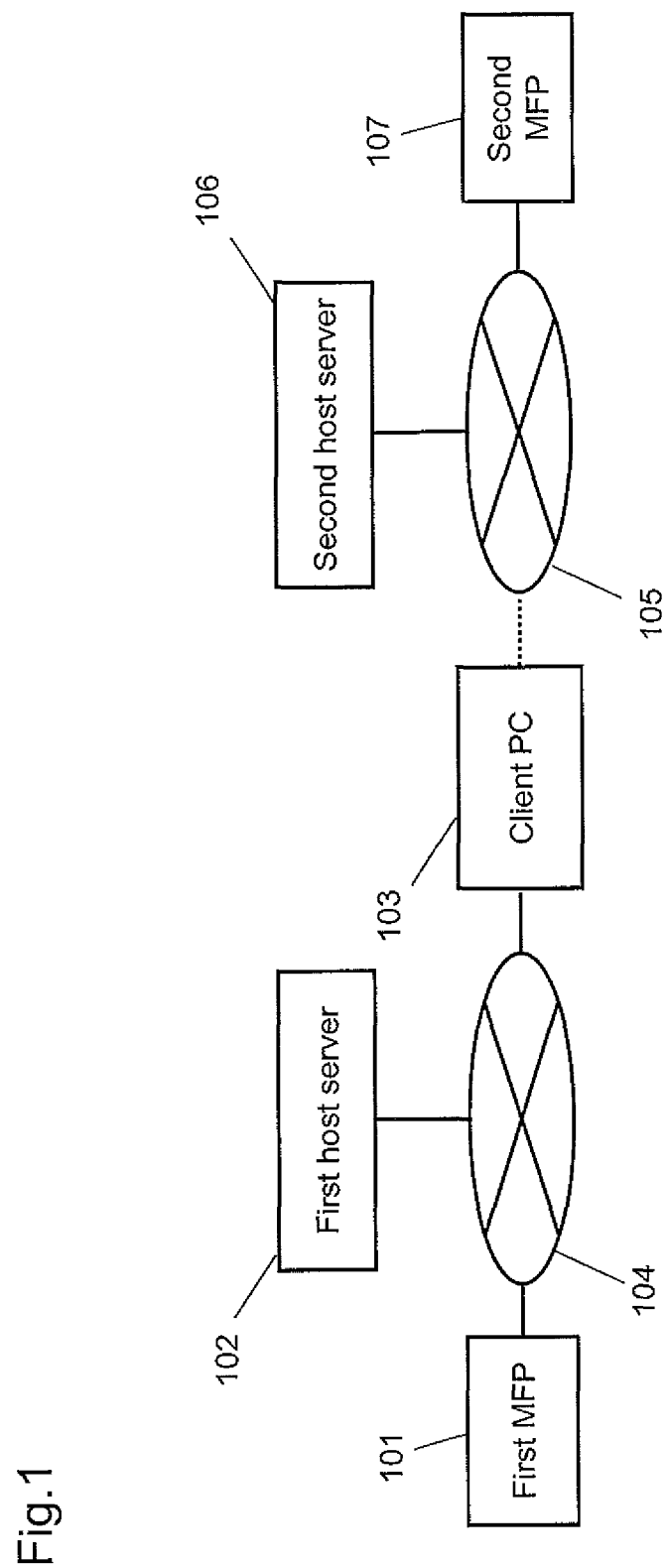
FIG. 1 is an explanatory drawing illustrating an example of a configuration of an information processing system according to the present invention.

In the present invention, the host server is not limited to a so-called file server and may be a normal personal computer as long as it can store profiles.

The storage section of the host server is a nonvolatile memory device for storing profile data. Examples of specific embodiments thereof include a hard disk drive. The function of the management section is carried out as a result of execution of a program by the CPU of the host server.

The information processing terminal is a terminal by which a user registers a profile. Examples of specific embodiments thereof include a normal personal computer and a handheld device. Especially, it may be a notebook PC, in particular, a mobile PC. In the embodiments to be described below, the information processing terminal corresponds to a client PC.

The user interface section of the information processing terminal corresponds to a display for displaying internal information being processed to the user, a keyboard by which the user performs input operation and a circuit for controlling the display and the keyboard. The function of the setting processing section is carried out as a result of execution of a program by the CPU of the information processing terminal.

The MFP performs document reading and printing jobs, and includes a display section to be used by a user for operation, an operation section having operation buttons, a printer engine section, a scanner section and control unit for controlling operation of these sections.

Hereinafter, preferred embodiments of the present invention will be described.

In the information processing system according to the present invention, the user interface section may receive entry of the identification code for determination by the user; and the setting processing section may request entry of the identification code for determination before the reception of the profile being set, acquire the identification code for determination via the user interface section and acquire a result of the comparison for determining whether or not the acquired identification code for determination and the identification code for management match to restrict items to be set by the user as the profile when the codes do not match. It is thereby possible to determine whether to treat the profile being set as temporary, allow only some items to be set when the profile is treated as temporary and allow every item to be set without restrictions when the profile is not treated as temporary. It is therefore possible to substantially restrict the amount of image data to be stored and substantially restrict prolonged use of the image data for temporary use.

The information processing terminal may have a memory section for storing data, the setting processing section may be operative as a result of execution of a processing program by a CPU, and the CPU may request entry of a license key of the processing program when the processing program is installed so that the license key entered is stored in the memory section to be used as the identification code for determination in the information processing terminal. According to this embodiment, the license key is used for the determination on whether to treat the profile as temporary, and it is therefore possible to obtain information constituting the basis for the determination without bothering the user.

The management section may register the profile provided by the information processing terminal in the storage section with a time when the profile was provided and periodically check temporary profiles registered in the storage section to find and delete a profile with the registered time after which a predetermined period of time has passed. Thereby, when the profiles registered in the host server include an expired temporary profile, the profile is determined to be unnecessary and deleted without bothering the user.

The period of time after the registration, which is a threshold for determining whether to delete the profile, may be set and changed by a system administrator, for example.

The management section may perform a function of specifying the items to be restricted when the codes do not match and provide information of the items to be restricted to the setting processing section. It is thereby possible for the system administrator to put restrictions for a user who registers a temporary profile to achieve flexible use according to the current situation of the system.

In the host server according to the present invention, the information processing terminal may request entry of the identification code for determination before the reception of the profile being set, receive entry of the identification code for determination by the user, compare the acquired identification code for determination with the identification code for management and determine whether or not the codes match to restrict items to be set by the user as the profile when the codes do not match; and the management section may perform a function of specifying the items to be restricted when the codes do not match and provides information of the items to be restricted to the information processing terminal.

Further, the management section may register the profile provided by the information processing terminal in the storage section with a time when the profile was provided and may periodically check temporary profiles registered in the storage section to find and deletes a profile with the registered time after which a predetermined period of time has passed.

The various preferred embodiments described herein may be combined with one another.

Hereinafter, the present invention will be described in detail with reference to the drawings. The following description is illustrative of the invention in all aspects and not to be construed as limiting the invention.

<<Configuration of Information Processing System and General Description of Profile Processing>>

FIG. 1 is an explanatory drawing illustrating an example of a configuration of an information processing system according to the present invention. In FIG. 1, a first MFP 101 and a second MFP 107 are devices having a scanning function, a facsimile function and a printing function. The first MFP 101 is connected to a network 104, and the second MFP 107 is connected to a network 105. In addition, to the network 104, a first host server 102 and a client PC 103 are connected.

To the network 105, apart from the network 104, a second host server 106 is connected. The client PC 103 is usually connected to the network 104 and occasionally connected to the network 105. Specifically, the client PC 103 is a portable notebook PC, and the network 104 is a network in an office where a user of the client PC 103 works. The client PC 103 is therefore usually connected to the network 104. However, when the user goes on a business trip or makes a presentation in a reception room some distance away from the office, the user may disconnect the client PC 103 from the network 104 and connect it to the network 105. As exemplified above, the client PC 103 can be a member of an information processing system on the network 104 or a member of an information processing system on the network 105 according to circumstances.

In the client PC 103, a driver enabling use of the first MFP 101 and an application enabling registration and use of profiles for scanning and printing are installed. It is necessary to enter a license key when the application is installed. The license key is stored in the first host server 102 by an administrator of the first host server 102 when the first host server 102 is installed.

Thereafter, when the application is installed in the client PC 103, entry of the license key is requested in the process of the installation. To progress the installation, the user must enter the license key upon the request. Here, the user is to enter a license key that corresponds to the license key stored in the first host server 102. In response to the entry of the license key by the user, an installer searches a server where the corresponding license key is stored. In the present case, the network accessible from the client PC 103 has the first host server 102. The license key stored in the first host server 102 corresponds to the license key entered by the user in the process of the installation as described above. The installation of the application in the client PC 103 is therefore progressed further.

The license key entered by the user is saved in the client PC 103. At the same time, access information to the first host server storing the corresponding license key is saved as a default profile registration destination. Furthermore, access information to the first MFP 101 is saved as a device to which the profiles registered in the first host server 102 are applied. Specific examples of the access information include IP addresses of the first host server 102 and the first MFP 101.

After the installation of the application is completed as described above and when the user creates a profile for job execution with the application in the client PC 103, the profile is stored in the host server 102. When the user wishes execution of a scanning job in the first MFP, for example, the user can use a registered profile with logging in to the user's account or without logging in as an ad hoc user. However, the profiles usable by the ad hoc user are limited to ad hoc profiles.

General steps for using a registered profile are as follows, which will be described in detail later. When a scanning job is to be executed, for example, a profile selection screen is displayed on a display of the first MFP 101. The screen displays profiles stored in the first host server 102. When the user logs in to the user's account, the profile selection screen displays the profiles registered by the user and the ad hoc profiles. When the user is an ad hoc user, the screen displays only the ad hoc profiles. When the profiles displayed include a profile that the user wishes to use, the user selects the profile, modifies the profile when needed, and then starts the scanning job. When the profiles displayed do not include a profile that the user wishes to use, the user can configure settings without using the profile.

Anyone can use the ad hoc profiles without login. It is convenient to register a profile to be shared between different users as an ad hoc profile. For example, an accounting document may need to be scanned and saved in a department for a purpose of so-called document filing. In this case, it should be avoided that settings including compression method, file format, color mode and image quality vary from member to member in the department who performs the scanning. The department may therefore register a profile for filing accounting documents as an ad hoc profile in the first MFP 101 and set a rule in which all the members use the profile.

In addition to the use as shared profiles, the ad hoc profiles have a use as temporary profiles. A specific example of the use is as follows.

Assume that the user of the client PC 103 goes on a business trip and needs to connect the PC to the network 105 to execute a scanning job with the second MFP 107. A driver applicable to the second MFP 107 has been installed in the client PC 103. An application that uses the first host server 102 as a profile registration destination and the first MFP 101 as a device to which the profile is applied has been installed in the client PC 103. However, no setting that uses the second host server 106 as a profile registration destination and the second MFP 107 as a device to which the profile is applied has not been saved.

An administrator of the second host server 106 stored an application for the second MFP 107 together with a license key in the second host server 106 at the time of the installation of the second host server 106. The license key stored in the second host server 106 is different from the license key stored in the first host server 102.

When the user tries to execute a scanning job with the second MFP 107, a display of the second MFP 107 displays a profile selection screen, on which only the profiles registered in the second host server 106 are selectable.

When the user wants to use a profile that the user uses at the office, that is, a profile registered in the first host server 102, it is necessary to register a new profile under the environment on the network 105.

When the user of the client PC 103 starts the application, the application search a server in which the profile can be registered within the currently accessible network 105. Then, the application will not find the first host server 102, which is the default profile registration destination, but find the second host server 106 in which the different license key is stored. Besides, the application will not find the first MFP 101 but find the second MFP 107 as the device to which the profile is applied. The application therefore recognizes the second host server 106 as an ad hoc profile registration destination and the second MFP 107 as the device to which the profile is applied. On the other hand, the second host server 106 determines the client PC 103 to be an ad hoc user because of the different license key. The ad hoc user is allowed to use the second MFP 107 with restrictions.

<<Configuration for Profile Processing>>

Figure 2:
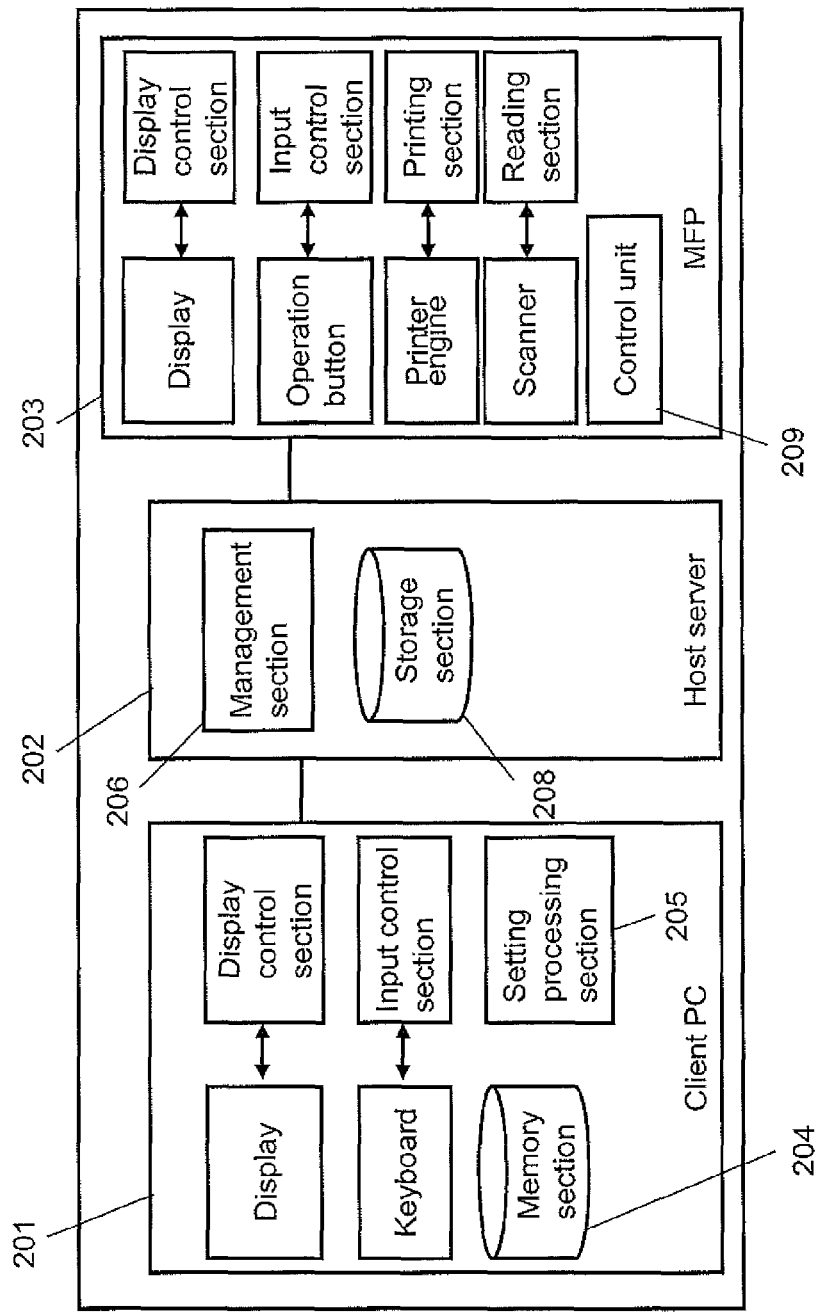
FIG. 2 is a block diagram illustrating, in particular, processing functions, which are relevant to profile processing, of components according to the present invention.

FIG. 2 is an explanatory drawing illustrating, in particular, processing functions, which are relevant to profile processing, of components of a host server, a client PC and a MFP constituting an information processing system according to the present invention.

In FIG. 2, a client PC 201 corresponds to the client PC 103 in FIG. 1 and includes a memory section 204 and a setting processing section 205. The memory section 204 is achieved as hardware by a nonvolatile memory such as a flash memory and a hard disk drive and stores a host server being a profile registration destination and a license key. The setting processing section 205 is achieved as hardware by a CPU of the client PC and a processing program to be executed by the CPU. In the stage of installing an application program for profile registration, it is achieved by a nonvolatile memory that stores programs of an installer and the application, and the CPU that executes the programs. The client PC 201 further has input-output units such as a well-known keyboard and display, and a circuit and a mechanism for controlling the input-output units, which correspond to a user interface section.

A host server 202 corresponds to the first host server 102 or the second host server 106 in FIG. 1 and includes a management section 206 and a storage section 208. The storage section 208 is achieved as hardware by a nonvolatile memory such as a flash memory and a hard disk drive and stores profiles registered. The management section 206 is achieved as hardware by a CPU of the host server 202 and a nonvolatile memory storing a program to be executed by the CPU and performs deletion of a registered profile, for example. The management section 206 also performs comparison between a license key sent from the client PC 201 and a license key stored therein to determine whether or not the license keys match.

A MFP 203 corresponds to the first MFP 101 or the second MFP 107 in FIG. 1. The MFP 203 includes a well-known display and operation keys with display control unit and input control unit as circuits for controlling the display and operation keys, a well-known printer engine and scanner with printing means and document scanning means as circuits for controlling the printer engine and the scanner, and control unit 209 for controlling operation of the functions. The control unit 209 is achieved as hardware by a microcomputer, a peripheral input-output circuit and a memory that stores programs.

<<Installation of Application>>

Figure 3:
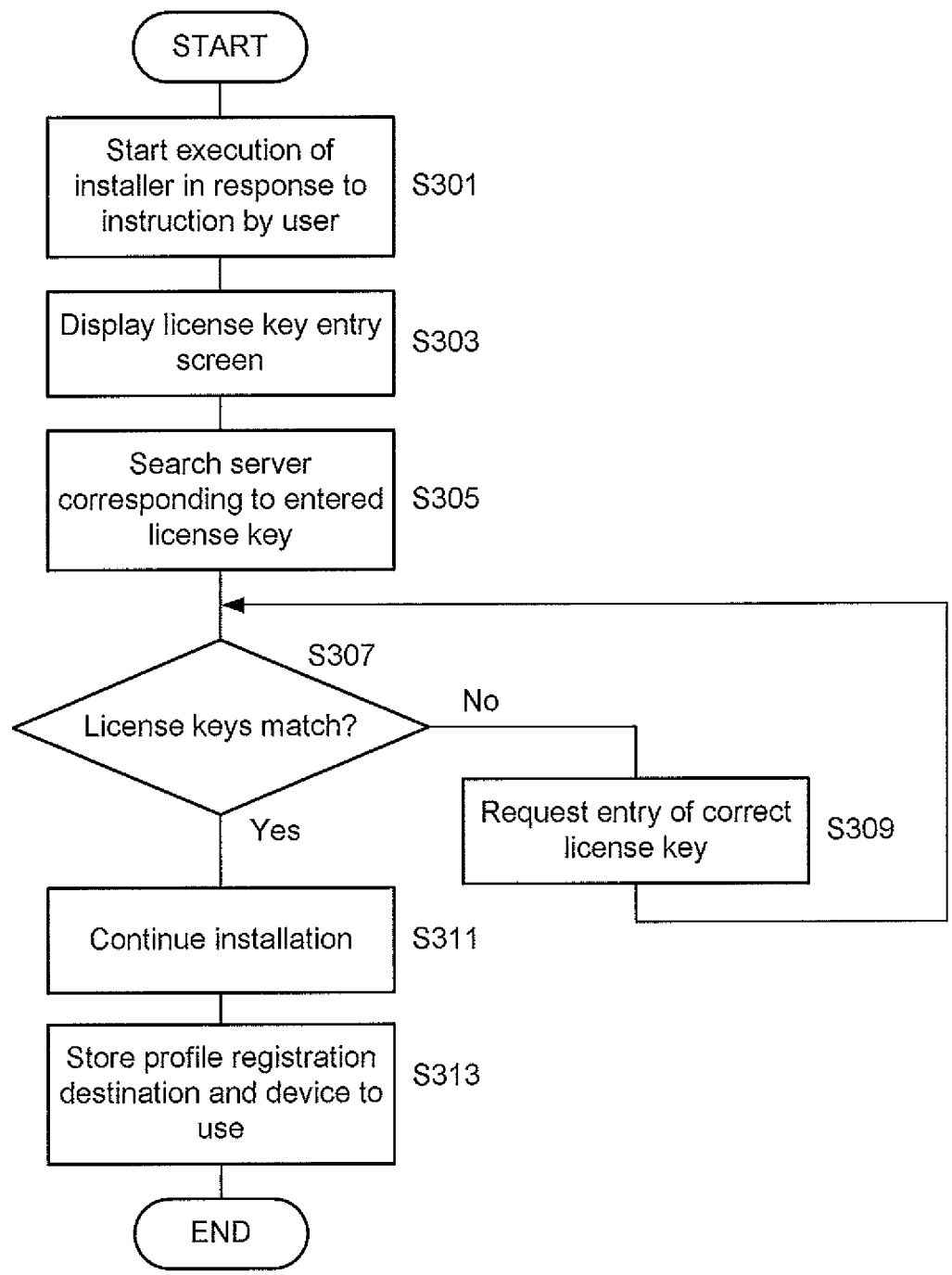
FIG. 3 is a flow chart showing steps for installation of an application for profile registration according to the present invention.

FIG. 3 is a flow chart showing steps for installation of an application for profile registration according to the present invention. This installation is initiated by a program of an installer executed by a CPU, not shown, of the client PC 201 in FIG. 2.

The procedure of the process will be described with reference to FIG. 3.

Before the installer is started, a system administrator installs the host server 202 and, at the same time, registers a license key in the host server 202.

Thereafter, the user starts the installer of the application for profile registration in the client PC 201, and in response the CPU of the client PC 201 starts manipulating the program of the installer (step S301). In a broad sense, the execution of the installer is included in the function of the setting processing section 205 in FIG. 2. The installer causes the display of the client PC 201 to display a license key entry screen (step S303).

Figure 7:
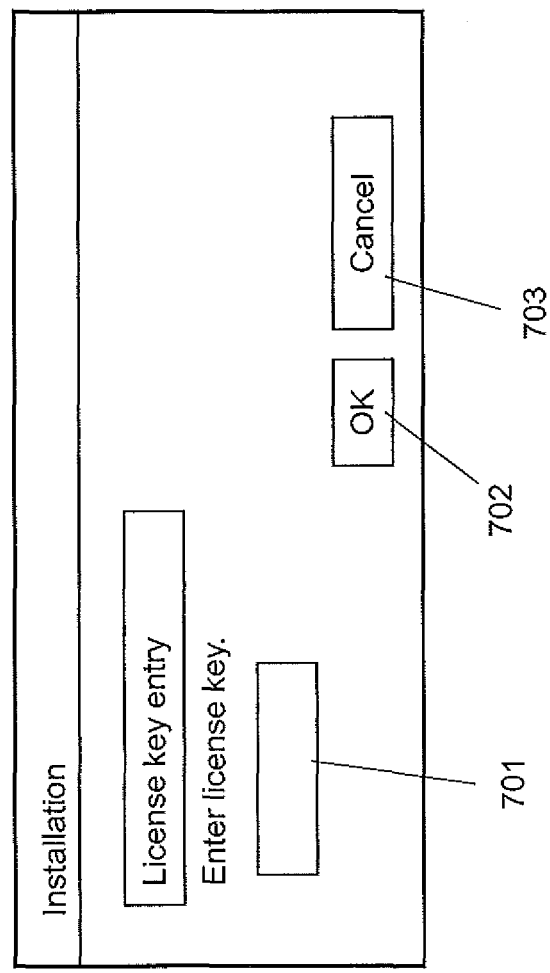
FIG. 7 is an explanatory drawing illustrating an example of a license key entry screen according to the present invention.

FIG. 7 is an explanatory drawing illustrating an example of the license key entry screen according to the present invention. The license key entry screen in FIG. 7 displays a message and an entry field 701 for prompting entry of a license key. When the user enters an appropriate license key in the entry field 701, and then clicks an "OK" button 702, the installer stores the information in the memory section 204. The installer then searches a server storing a license key corresponding to the entered license key out of accessible servers on the network (step S305). When a "Cancel" button 703 is clicked on the screen in FIG. 7, the installation is stopped.

The entered license key is compared with the license key registered in the host server (step S307), and when the license keys match, the routine goes on to step S311. On the other hand, when the license keys do not match ("No" in step S307), the routine goes on to step S309, and the display shows a message for prompting entry of a correct license key. Then, the routine returns to step S307 to wait for new entry.

When the license keys match in step S307 ("Yes" in step S307), the installer continues the installation (step S311) and stores an IP address of the host server 202 in the memory section 204 as a profile registration destination. In addition, the installer stores an IP address of the MFP 203 on the network in the memory section 204 as a device to which the profile is applied (step S313).

Then, the installation is completed. These are the installation steps.

<<Registration of Profile>>

Figure 4:
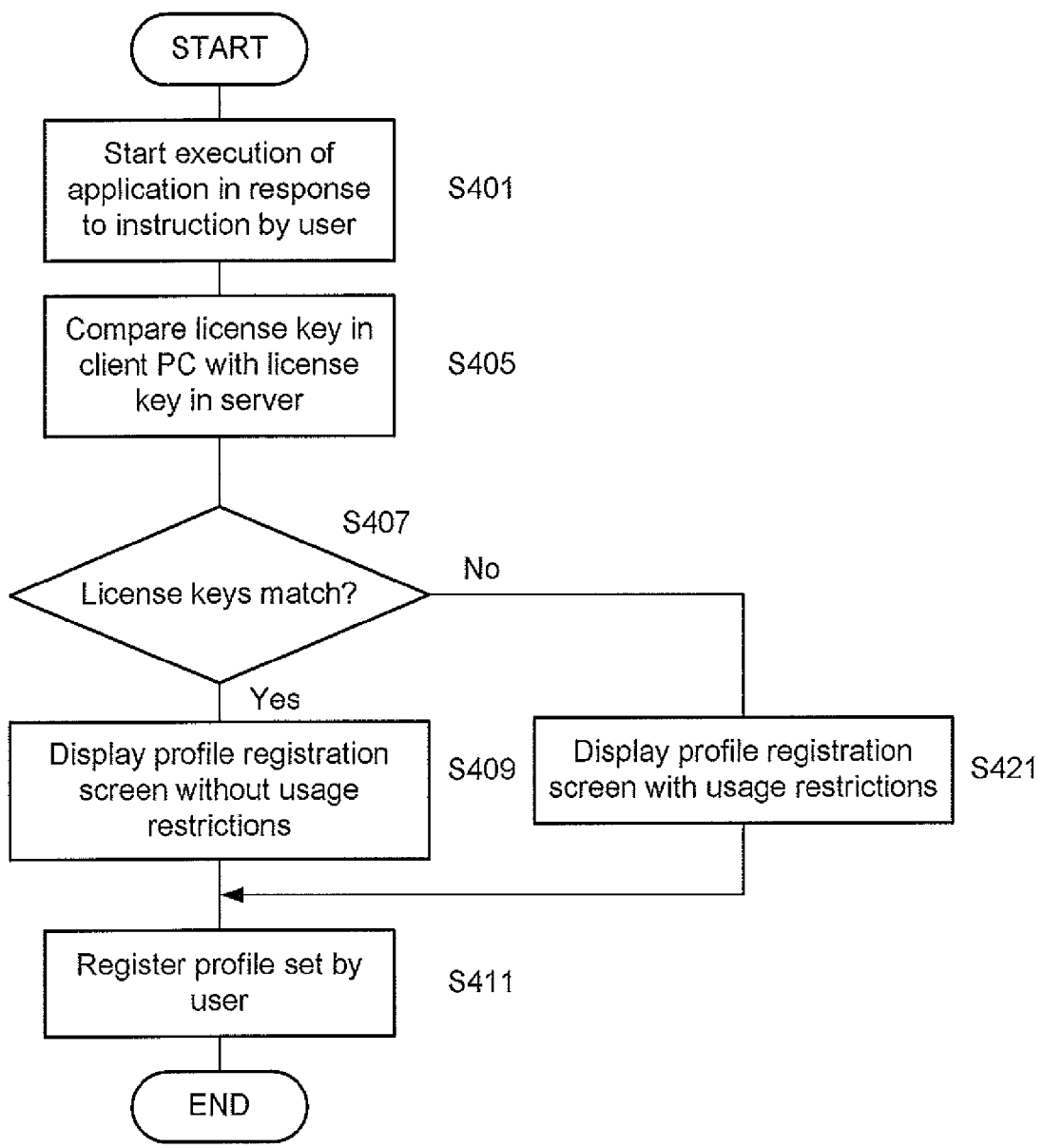
FIG. 4 is a flow chart showing steps for the profile registration according to the present invention.

FIG. 4 is a flow chart showing steps for profile registration according to the present invention. The procedure of the process will be described with reference to FIG. 4.

The user starts the application for profile registration, and in response the CPU of the client PC 201 starts manipulating the program of the application (step S401).

At the same time, the CPU accesses the host server 202 having the IP address stored in the memory section 204 as the profile registration destination. Then, the license key entered at the time of the installation and stored in the memory section 204 is compared with the license key registered in the host server 202 (step S405). When the license keys match, the routine goes on to step S409 ("Yes" in step S407). Then, a profile registration screen without usage restrictions is displayed (step S409).

Figure 9:
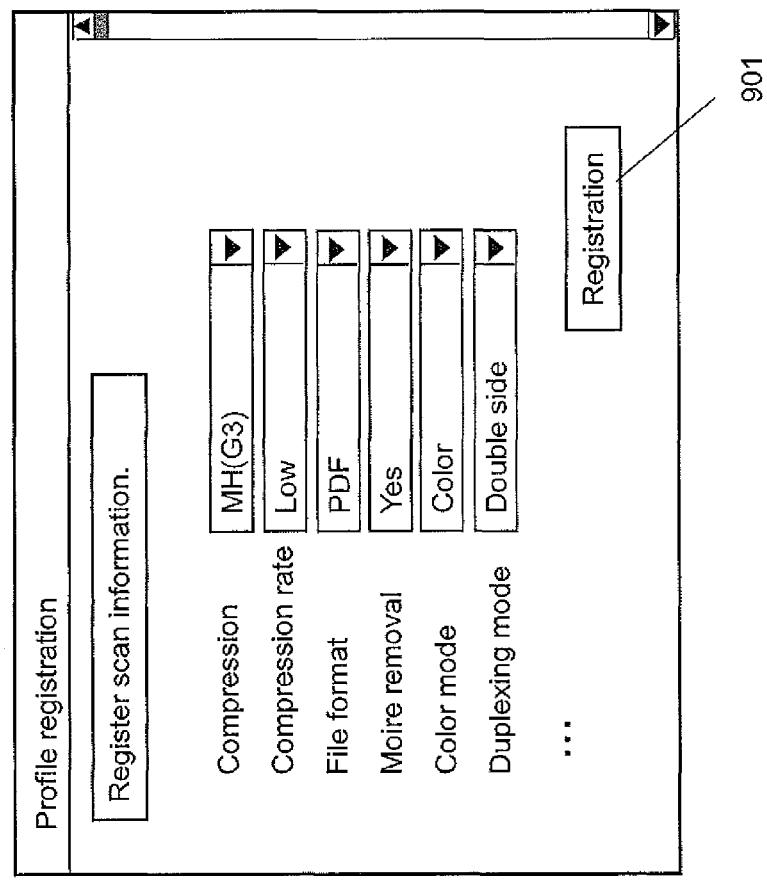
FIG. 9 is an explanatory drawing illustrating an example of a profile registration screen without usage restrictions according to the present invention.

FIG. 9 is an explanatory drawing illustrating an example of the profile registration screen to be displayed in step S409. The example in FIG. 9 has "Compression", "Compression rate", "File format", "Moire removal", "Color mode" and "Duplexing mode" as settable items. For the "Compression", "MH (G3)" or "MMR (G4)" can be selected as a compression method for image data. For the "Compression rate", "Low", "Medium" or "High" can be selected. For the "File format", "PDF", "JPEG", "TIFF" or "XPS" can be selected. For the "Moire removal", "Yes" or "No" can be selected. For the "Color mode", "Color", "Gray scale" or "Monochrome" can be selected. For the "Duplexing mode", "One side" or "Double side" can be selected. The user uses the registration screen in FIG. 9 to set each item.

When the user completes selection for each item, and then clicks a "Registration" button 901, the CPU, in response, displays a screen on which the user enters a profile name. The user enters a profile name on the screen displayed, and then the CPU registers the set profile with the set profile name in the storage section 208 of the host server 202 (step S411).

Figure 10:
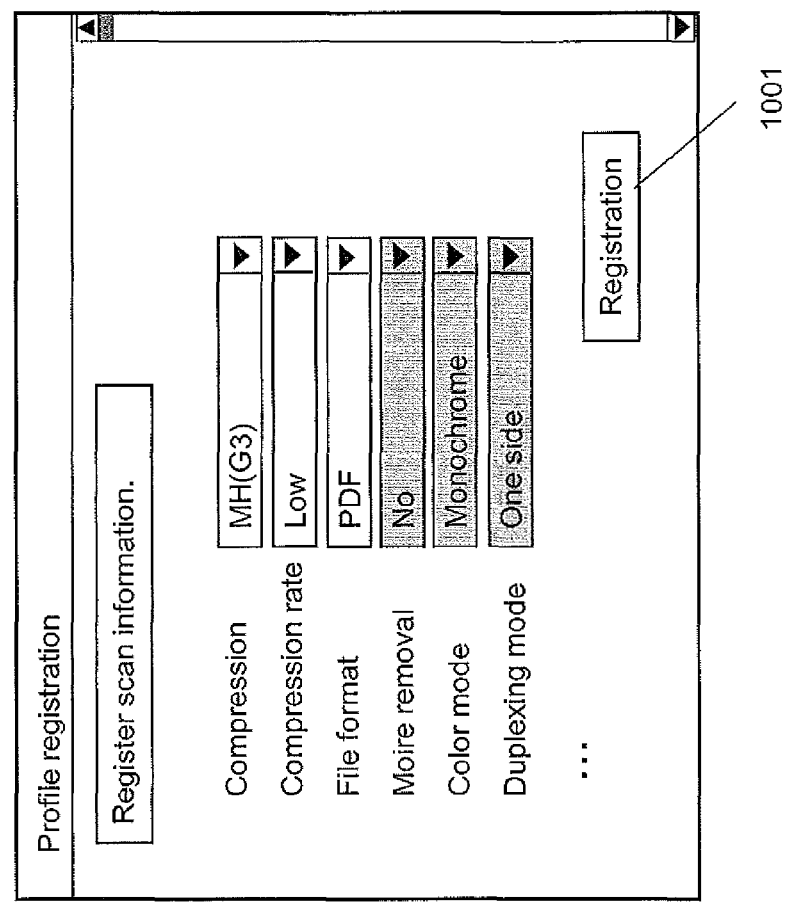
FIG. 10 is an explanatory drawing illustrating an example of a profile registration screen with usage restrictions according to the present invention.

On the other hand, when the license keys do not match in step S407, ("No" in step S407), the routine goes on to step S421, and a profile registration screen with usage restrictions is displayed (step S421). FIG. 10 is an explanatory drawing illustrating an example of the profile registration screen with usage restrictions to be displayed in step S421. In the example in FIG. 10, "Compression", "Compression rate" and "File format" are settable items as in the case of FIG. 9, but "Moire removal", "Color mode" and "Duplexing mode" are not settable. "Moire removal" is fixed at "No", "Color mode" is fixed at "Monochrome", and "Duplexing mode" is fixed at "One side".

The system administrator can preliminarily set usage restrictions for ad hoc users on the host server 202.

The user performs selection for each settable item, and then clicks a "Registration" button 1001, and in response the routine goes on to step S411. The CPU displays a screen on which the user enters a profile name, and the user enters a profile name, and then the CPU registers the set profile with the set profile name in the storage section 208 of the host server 202. On the occasion of the registration, the time when the profile is registered is also stored in the storage section 208 for deletion of the profile to be described later.

<<Use of Profile>>

Figure 5:
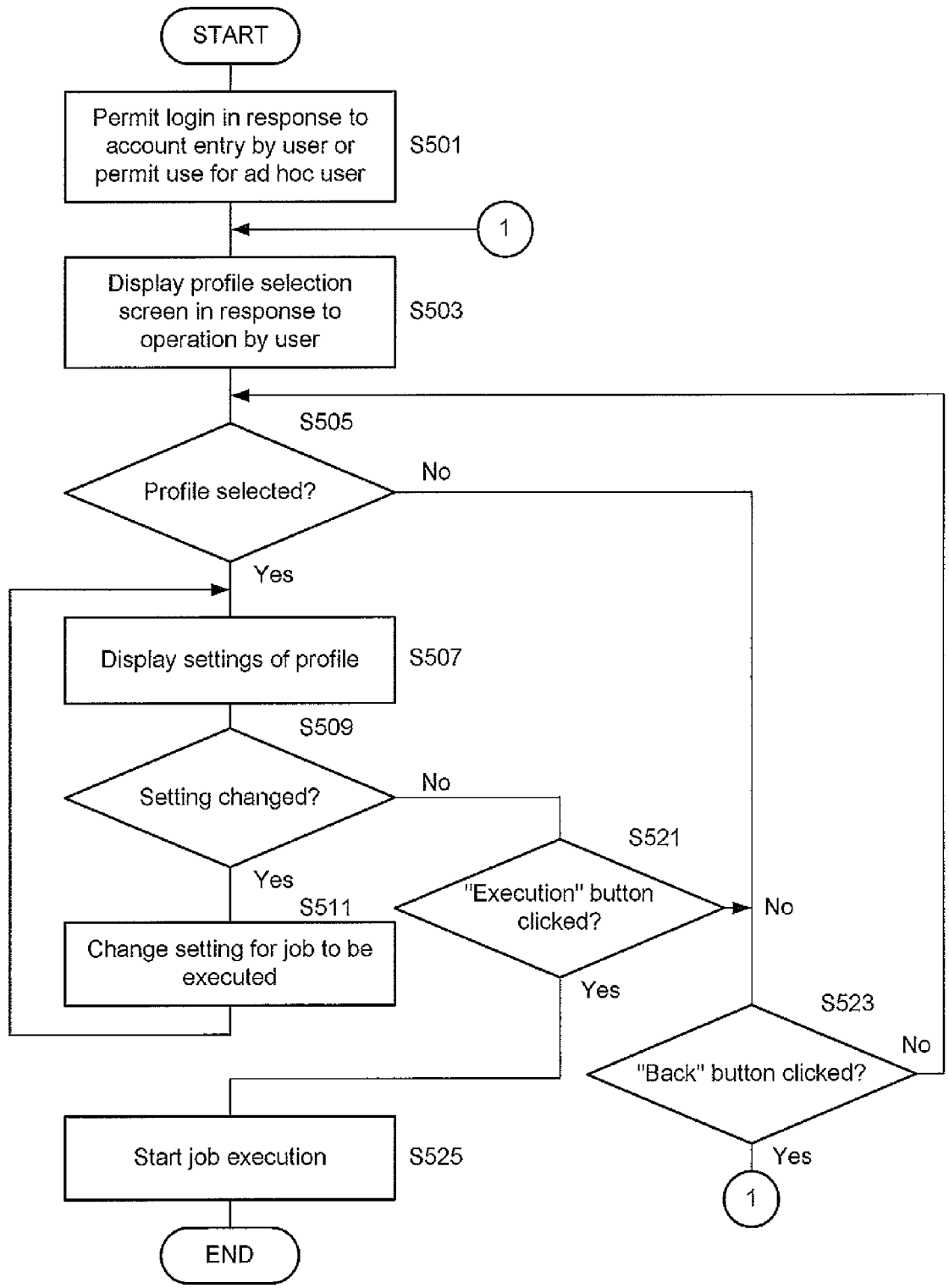
FIG. 5 is a flow chart showing steps for execution of a job by a user by use of a registered profile according to the present invention.

FIG. 5 is a flow chart showing steps for execution of a job by a user by use of a registered profile according to the present invention. The procedure of the process will be described with reference to FIG. 5. Here, a scanning job will be described as an example.

Prior to the job execution, the user enters an account assigned to every user or every department by the system administrator by use of an operation key of the MFP 203, and in response the control unit 209 of the MFP permits login to the MFP 203, recognizing the user as a user according to the account entered (step S501). When the user logs in without entering an account, the control unit 209 treats the user as an ad hoc user. The ad hoc user can use the MFP 203, but usable functions are limited.

Figure 8:
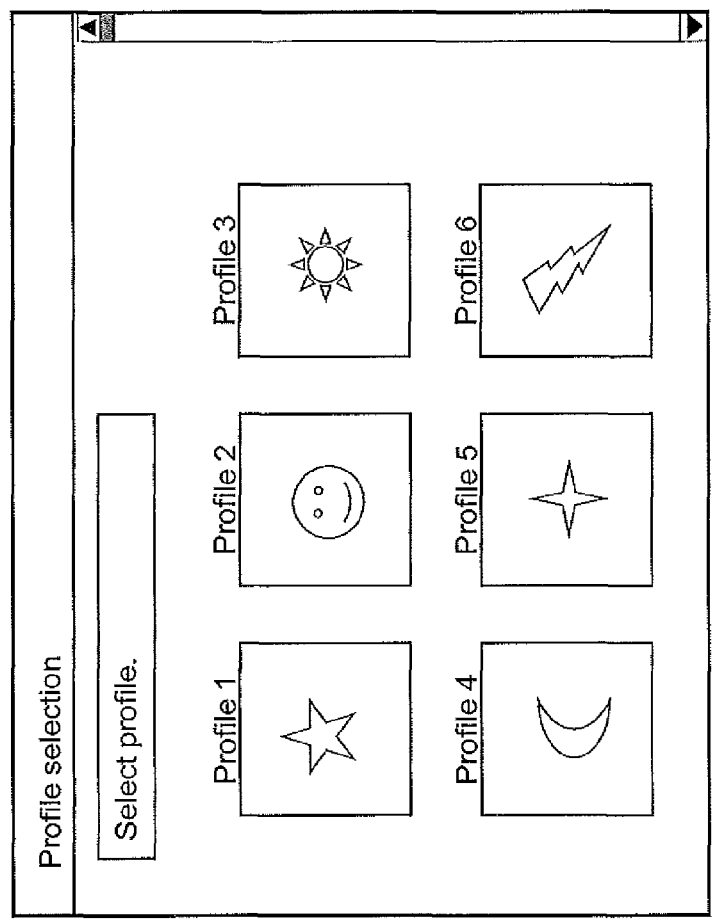
FIG. 8 is an explanatory drawing illustrating an example of a profile selection screen according to the present invention.

After the login, the user does a specified operation via an operation key of the MFP 203 to execute the scanning job, and in response the control unit 209 causes the MFP 203 to display a profile selection screen on the display (step S503). FIG. 8 is an explanatory drawing illustrating an example of the profile selection screen according to the present invention. The profile selection screen in FIG. 8 displays profiles preliminarily registered for the account to which the user logged in and ad hoc profiles. The profile selection screen displays the ad hoc profiles as profiles to be shared among all accounts. The screen in FIG. 8 displays six profiles named "Profile 1" to "Profile 6". When more profiles are registered, the other profiles can be displayed by moving a scroll bar on the right side of the screen.

Figure 11:
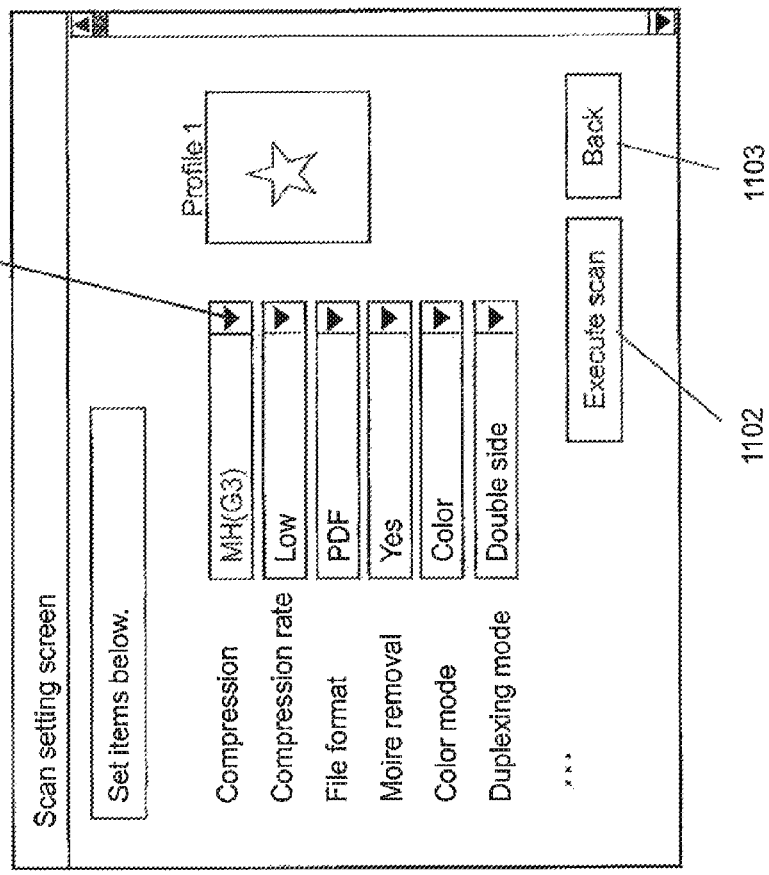
FIG. 11 is an explanatory drawing illustrating an example of a screen showing settings of a profile selected in the present invention.

When the user selects a profile to use from the displayed profiles ("Yes" in step S505), the control unit 209, in response, displays the settings of the selected profile on the display (step S507). FIG. 11 is an explanatory drawing illustrating an example of the screen showing the settings of the selected profile. In the example, "Profile 1" is selected.

When the user changes a setting by clicking a pull-down menu 1101 on the screen ("Yes" in step S509), the control unit 209, in response, changes the setting of the scanning job to be performed (step S511) and updates the display of the settings of the profile (step S507).

When the user completes the setting change and clicks a "Execute scan" button 1102 ("Yes" in step S521), the control unit 209, in response, starts the scanning job (step S525).

When the user clicks a "Back" button 1103 ("Yes" in step S523), the control unit 209, in response, gets the screen on the display back to the profile selection screen (step S503).

<<Deletion of Unnecessary Profile>>

As described above, the ad hoc profiles are used for the purpose of shared use among users having different accounts and for the purpose of temporary use. It is not preferable that a profile registered for the latter purpose is left undeleted after the job execution for which the profile was registered, because in this case the unnecessary profile is displayed on the profile selection screen when another user performs profile selection. The CPU of the host server therefore executes deletion of an ad hoc profile that was registered for the purpose of temporary use and that has been kept for a predetermined period of time after the registration of the profile. The ad hoc profiles registered for the purpose of shared use among users having different accounts may be protected so as to be excluded from the deletion.

Figure 6:
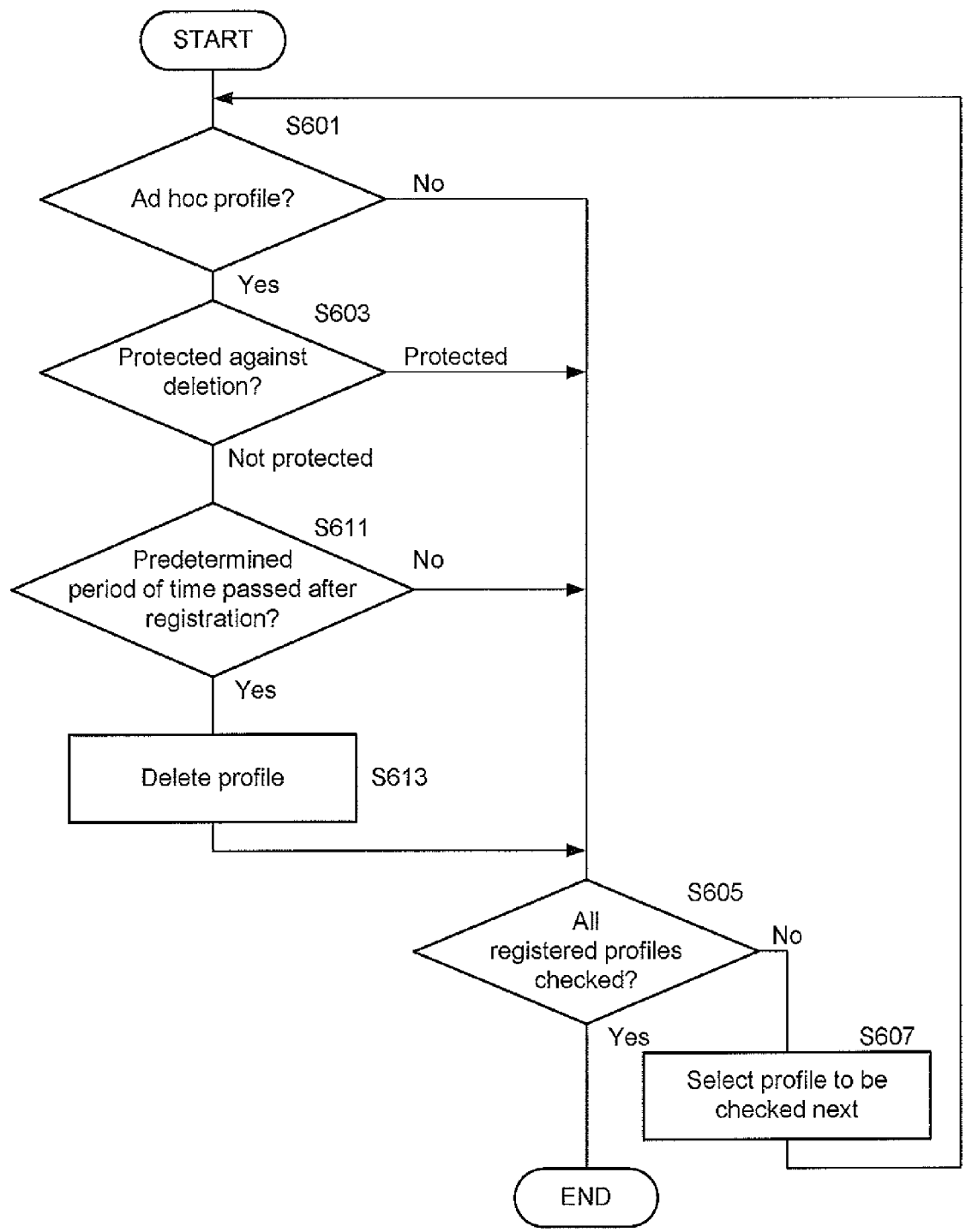
FIG. 6 is a flow chart showing steps for profile deletion according to the present invention.

FIG. 6 is a flow chart showing steps for profile deletion according to the present invention. The profile deletion will be described with reference to FIG. 6.

The CPU of the host server 202 repeats execution of a program for the profile deletion to be described below. The cycle of the repetition can be set by a system administrator, for example.

When the time of starting the deletion comes, the CPU starts execution of the program for the profile deletion. Then, every profile stored in the storage section 208 is determined as to whether or not it is an ad hoc profile (step S601). When the profile is ad hoc ("Yes" in step S601), whether or not the profile is protected against the deletion is determined (step S603). When the profile is not protected, the routine goes on to step S611.

When the profile is not ad hoc ("No" in step S601) or the profile is protected against the deletion ("Protected" in step S603), the routine goes on to step S605 to confirm whether or not all the registered profiles have been checked. When there is any registered profile left unchecked ("No" in step S605), the registered profile to be checked next is selected (step S607), and the routine goes on to step S601.

When all the registered profiles have been checked ("Yes" in step S605), the process is completed.

A registered profile that is ad hoc and that is not protected, if any, ("Not protected" in step S603) is determined by the CPU as to whether the profile is within a preset time limit (step S611).

When the profile is within the time limit ("No" in step S611), the routine goes on to step S605. On the other hand, when the profile has passed the time limit ("Yes" in step S611), the CPU deletes the profile from the storage section 208 (step S613). Then, the routine goes on to step S605 to confirm whether all the registered profiles have been checked.

Thus, a registered profile is deleted.

The deletion is performed periodically thereby to delete ad hoc profiles that have been used temporarily and that have passed the time limit. Accordingly, the profile selection screen in FIG. 8 does not display unnecessary profiles to help the user find a desired profile.

Various modifications are possible for the present invention in addition to the embodiments described above. It should be understood that such modifications also fall within the aspects and scope of the present invention. The present invention is intended to embrace all alterations made within the scope of the invention defined by the appended claims and their equivalents.

What is claimed is:

1. An information processing system, comprising:
   (1) a multifunction peripheral for reading a document according to a condition set by a user;
   (2) a host server communicably connected with the multifunction peripheral and having a storage section for storing the condition as a profile and a management section for executing registration of the profile in the storage section and deletion of the registered profile; and
   (3) an information processing terminal communicably connected with the host server and having a user interface section for receiving the profile being set by the user and a setting processing section for providing the received profile to the management section,
   wherein the storage section preliminarily stores an identification code for management to use for the management of the profile,
   the setting processing section acquires an identification code for determination and provides the identification code for determination to the management section prior to the registration of the profile, and
   the management section compares the provided identification code for determination with the identification code for management to register the profile provided by the information processing terminal in the storage section without a time limit when the codes match or register the profile provided by the information processing terminal with a time limit when the codes do not match to delete the profile when the time limit elapses.

2. The information processing system according to claim 1, wherein
   the user interface section receives entry of the identification code for determination by the user; and
   the setting processing section requests entry of the identification code for determination before the reception of the profile being set, acquires the identification code for determination via the user interface section and acquires a result of the comparison for determining whether or not the acquired identification code for determination and the identification code for management match to restrict items to be set by the user as the profile when the codes do not match.

3. The information processing system according to claim 1, wherein
   the information processing terminal has a memory section for storing data,
   the setting processing section is operative as a result of execution of a processing program by a CPU, and
   the CPU requests entry of a license key of the processing program when the processing program is installed so that the license key entered is stored in the memory section to be used as the identification code for determination in the information processing terminal.

4. The information processing system according to claim 1, wherein
   the management section registers the profile provided by the information processing terminal in the storage section with a registered time when the profile was provided and periodically checks temporary profiles registered in the storage section to find and deletes a profile with the registered time after which a predetermined period of time has passed.

5. The information processing system according to claim 2, wherein
   the management section performs a function of specifying the items to be restricted when the codes do not match and provides information of the items to be restricted to the setting processing section.

6. A method for managing a profile in an information processing system, the information processing system comprising:
(1) a multifunction peripheral for reading a document according to a condition set by a user;
(2) a host server communicably connected with the multifunction peripheral and having a storage section for storing the condition as a profile and a management section for executing registration of the profile in the storage section and deletion of the registered profile; and
(3) an information processing terminal communicably connected with the host server and having a user interface section for receiving the profile being set by the user and a setting processing section for providing the received profile to the management section,
the method comprising:
storing an identification code for management to use for the management of the profile in the storage section by use of the management section;
acquiring an identification code for determination and provides the acquired identification code for determination to the management section prior to the registration of the profile by use of the setting processing section; and
comparing the identification code for determination with the identification code for management by use of the management section to register the profile provided by the information processing terminal in the storage section without a time limit when the codes match or register the profile provided by the information processing terminal with a time limit when the codes do not match to delete the profile when the time limit elapses.

7. A host server communicably connected with an external multifunction peripheral for reading a document according to a condition set by a user and with an external information processing terminal including a setting processing section, the host server comprising:
a storage section for storing the condition as a profile, and
a management section capable of executing registration of the profile in the storage section and deletion of the registered profile, wherein
the information processing terminal receives the profile being set by the user and provides the profile to the management section,
the storage section preliminarily stores an identification code for management to use for the management of the profile,
the setting processing section acquires an identification code for determination and provides the identification code for determination to the management section prior to the registration of the profile, and
the management section compares the provided identification code for determination with the identification code for management to register the profile provided by the information processing terminal in the storage section without a time limit when the codes match or register the profile provided by the information processing terminal with a time limit when the codes do not match to delete the profile when the time limit elapses.

8. The host server according to claim 7, wherein
the information processing terminal requests entry of the identification code for determination before the reception of the profile being set, receives entry of the identification code for determination by the user, compares the acquired identification code for determination with the identification code for management and determines whether or not the codes match to restrict items to be set by the user as the profile when the codes do not match; and
the management section performs a function of specifying the items to be restricted when the codes do not match and provides information of the items to be restricted to the information processing terminal.

9. The host server according to claim 7, wherein
the management section registers the profile provided by the information processing terminal in the storage section with a registered time when the profile was provided and periodically checks temporary profiles registered in the storage section to find and deletes a profile with the registered time after which a predetermined period of time has passed.

* * * * *